Jan. 28, 1930. A. BARGEBOER 1,745,000
LIQUID MEASURING APPARATUS
Filed May 7, 1928   2 Sheets-Sheet 2

Patented Jan. 28, 1930

1,745,000

UNITED STATES PATENT OFFICE

ADOLF BARGEBOER, OF THE HAGUE, NETHERLANDS, ASSIGNOR TO NAAMLOOZE VENNOOTSCHAP: MAATSCHAPPIJ VOOR NITVINDINGEN VAN DIKKERS EN BARGEBOER, OF THE HAGUE, NETHERLANDS

LIQUID-MEASURING APPARATUS

Application filed May 7, 1928, Serial No. 275,913, and in the Netherlands July 29, 1927.

My invention relates to liquid measuring apparatus. As is known in the art there exist apparatus of this character for measuring oil, for example, in which the liquid is led under pressure to a measuring receptacle provided with a measuring piston whose stroke in the receptacle determines the unitary volume of liquid to be dispensed.

The present invention relates to liquid measuring and distributing apparatus of the character indicated and has for an object to produce a device which assures rigorous exactitude in the measuring operation.

The means employed in this end consist, on the one hand, in a locking device reciprocated by the measuring piston and the reversing organ of the apparatus in combination with a separating device producing separation and elimination of the gas carried along with the liquid before the entry thereof into the measuring receptacle.

The invention is further comprised in the adjunction of a closing mechanism in the distribution conduit thereof, shutting off the distribution conduit and preventing all dispensing of liquid as long as a certain predetermined pressure is not attained in the said conduit.

In the accompanying drawing showing by way of example an embodiment of my invention—

Figure 1:
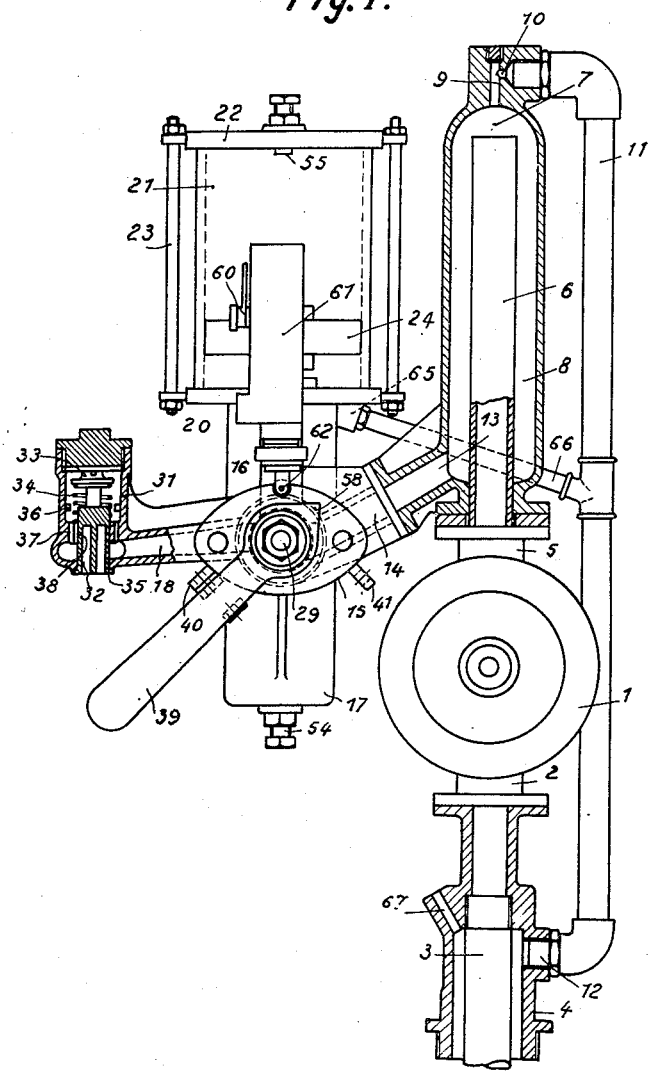
Fig. 1 is a vertical longitudinal section with parts in elevation of a liquid pump constructed according to the invention.

In the embodiment shown, 1 designates a pump of suitable design; for example, a hand pump whose inlet tube 2 is placed in communication with a supply tank, not shown, through the medium of a conduit 3, surrounded by a shell 4.

The outlet tube 5 of the pump 1 is placed in communication with a conduit 6, extending into a tube 8 up to the upper part 7 thereof. The said upper part 7 of tube 8 is provided with an air exhaust canal 9 communicating directly with a small opening 10, whose purpose will be subsequently described, which in turn is coupled to a return pipe 11, opening into shell 4 leading to the supply tank, at 12.

The lower extremity of pipe 8 communicates, by means of a fitting 13 with a fitting 14 of a distributing organ 15 consisting for example, of a many-way cock furnished with fittings 16 and 18.

The body of cock 15 is provided with an integral member 17, having a flange 20 on which bears a glass measuring receptacle 21, closed by a cover 22, secured by means of bolts 23. The interior of the measuring receptacle is divided into two compartments 25 and 26 through a piston 24, the lower compartment 26 communicating directly with the fitting 16 of cock 15.

Figure 3:
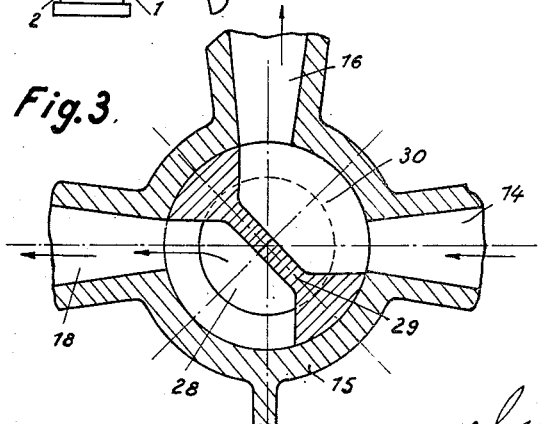
Fig. 3 is a section along the line 3—3 of Fig. 2.

Piston 24 is provided with a hollow rod 27 which places the compartment 25 of the receptacle in communication with a chamber 19 in member 17, the chamber 19 being in communication with a canal 28 of the rotary element 29 of the cock 15. A canal 30 provided in said rotary element is, as shown in Fig. 3, in communication with fitting 16 and the inlet fitting 14, while the chamber 19 is placed in communication with the fitting 18 of the cock by means of a canal 28 provided in the rotary element.

The fitting 18 communicates with a chamber 31, which automatically establishes communication with the atmosphere through a piston valve 32 provided at the top with a disc 33. A helicoidal spring 34 maintains the said piston valve on its seat by pressing against the said disc. The valve seat 35 of the piston valve and the stops 36 situated in chamber 31 cooperating with the edge of disc 33 limit the stroke of the piston valve.

The chamber 31 communicates with the fitting 18 by means of canals 37, whereas the piston valve 32 is provided with passages 38, placing the fitting 18 into communication with the atmosphere through the interior of the piston valve when the piston valve is in its lower position.

The apparatus is furthermore provided with a reciprocable locking device between the piston rod 27 and the rotary element 29 of the cock 15. The construction of the said locking device will now be described.

The rotary leement 29 is furnished with a handle 39 whose oscillatory movement is limited by stops 40, 41. The rotary element 29 (Fig. 4) is provided at one extremity with a transverse groove 42 and a second transverse groove 43, perpendicular to the first groove. The element 29 moreover carries a toothed sector 44 preventing rotation thereof in one direction and a second toothed sector 45 preventing rotation thereof in the other direction.

Figure 4:
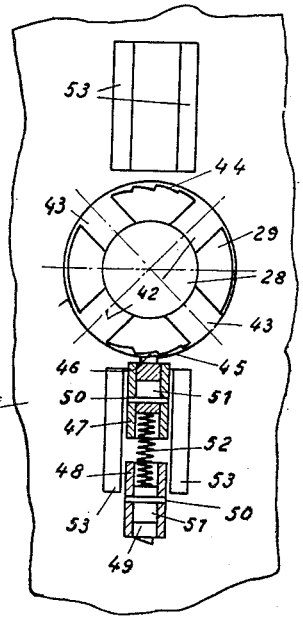
Fig. 4 is an elevational view of the automatic locking device in a position intermediate the reversing organ.

The sector 45 is, according to Fig. 4, in engagement with a pawl 46, mounted on an annular member 47, adjustably secured to the piston rod 27.

A second analogous annular member 48 is fixed to the piston rod 27 and also carries a pawl 49. The said pawls are guided by a mortise and tenon arrangement 50, 51 and are moved away from each other by a common spring 52.

The locking device is given a length corresponding to the stroke of piston 24 by suitably placing the annular members 47, 48 on rod 27.

Figure 2:
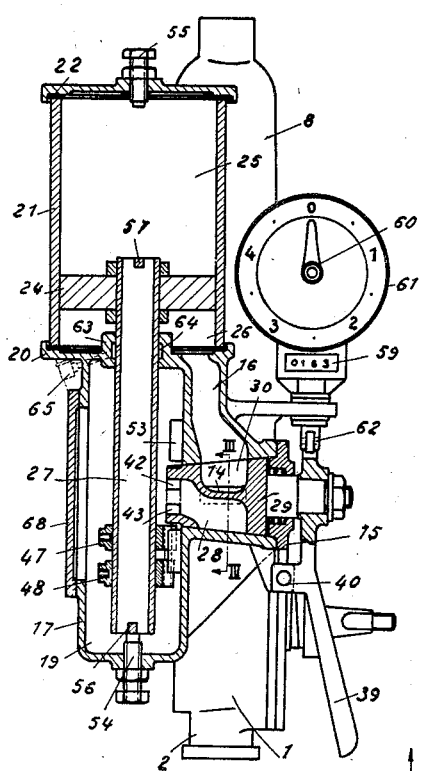
Fig. 2 is a vertical longitudinal section perpendicular to the plane of section of Fig. 1 with parts in elevation.

The members 46, 49 can engage either in slots 43 and 44 of rotary member 29 or between guides 53 provided in chamber 19 (Figs. 2 and 4). The members 46, 49 which constitute the bolt of the locking device are displaced with the rod 27 of piston 24, whose stroke is limited by stops 54, 55 cooperating with abutments 56, 57 on rod 27.

The rod 27 of piston 24 traverses the bottom of the measuring receptacle through a stuffing box 63 in which is provided a circular recess 64 connecting with a canal 65 communicating by means of a pipe 66 with the shell 4. This arrangement permits evacuation of the oil coming from chamber 26 through the stuffing box 63.

The shell 4 is provided with an air-inlet orifice 67.

In order to register each complete stroke of piston 24 during displacement of the rotary element of the cock, the said cock has been provided with a projection 58 actuating a totalizing counter 59 and a fractional counter 60 in connection with a rod and roller 62 projecting from the counter casing 61.

The operation of my device is as follows:

When the pump is started, the air eventually carried along by the liquid escapes through the small opening 10 and the pipe 11 and returns to the shell 4. As soon as the air or other gas of the oil or other liquid being pumped, however, attains the opening 10, the pressure increases and the oil (Figs 2 and 3) is pushed through canal 30 of rotary element 29 and the fitting 16 into the chamber 26 of the measuring receptacle 21 beneath piston 24 which becomes displaced in the upward direction carrying with it the piston rod 27.

The rotary element of the cock cannot be displaced at this moment since the bolt 46, 49 is in engagement with one of the grooves 43 of the rotary element. As soon as the piston 24 reaches the abutment 55, the bolt 46, 49 is above the rotary element and said rotary element may be turned in the direction permitted by the toothed sector 44 until handle 39 is stopped by abutment 41. The pumping operation continuing, the oil now entering the canal 28 of the rotary element, can attain through the hollow rod 27 of piston 24, the upper part 25 of the measuring receptacle and force the piston 24 toward the bottom. The oil which has been led in under the piston during the preceding stroke is now pushed back through canal 16 and canal 30 of the rotary element now communicating with the fitting 18. Due to the over pressure produced, which can reach the chamber 31, the valve 32 opens and the quantity of oil measured is thus dispensed.

Meanwhile, the pumping continuing the chamber 25 of the measuring receptacle becomes filled when the piston rod has been stopped by the abutment 56. The rotary element is unlocked and can be manipulated by means of handle 39 until stopped by abutment 40. The toothed sector 45 prevents rotation thereof in the opposite direction.

As concerns the guaranty against voluntary or involuntary fraud, it results from the foregoing, that the reversing organ cannot be manipulated until the measuring piston has reached the upper or lower end of its stroke, that any manipulation of the reversing organ once commenced must of necessity be completed in one direction or the other, that displacement of the measuring piston is rendered impossible once the stroke of the reversing organ has been started but not completely terminated.

I claim:

1. An apparatus for distributing liquids in measured quantities comprising, in combination, a measuring vessel, means for introducing the liquid to be dispensed into said measuring vessel under pressure, liquid reversing means connected to said vessel, a double acting measuring piston in said vessel, and locking means controlled by said piston adapted to prevent manipulation of said liquid reversing means before said piston has attained the end of its stroke.

2. An apparatus for distributing liquids in measured quantities comprising, in combination, a measuring vessel, means for introducing the liquid to be dispensed into said measuring vessel under pressure, liquid reversing means connected to said vessel, a double acting measuring piston in said vessel, locking means controlled by said piston adapted to prevent manipulation of said liquid reversing means before said piston has attained the end of its stroke, and means on said locking means for preventing rotation of said liquid reversing means in one direction when unlocked by said locking means.

3. An apparatus for distributing liquids in measured quantities comprising, in combination, a measuring vessel, means for introducing the liquid to be dispensed into said measuring vessel under pressure, liquid reversing means connected to said vessel, a double acting measuring piston in said vessel, locking means controlled by said piston adapted to prevent manipulation of said liquid reversing means before said piston has attained the end of its stroke, and means for separating any gas carried along by the liquid to be dispensed before said liquid enters said measuring vessel.

4. An apparatus for distributing liquids in measured quantities comprising, in combination, a measuring vessel, means for introducing the liquid to be dispensed into said measuring vessel under pressure, liquid reversing means connected to said vessel, a double acting measuring piston in said vessel, locking means controlled by said piston adapted to prevent manipulation of said liquid reversing means before said piston has attained the end of its stroke, means on said locking means for preventing rotation of said liquid reversing means in one direction when unlocked by said locking means, and means for separating any gas carried along by the liquid to be dispensed before said liquid enters said measuring vessel.

5. An apparatus for distributing liquids in measured quantities comprising, in combination, a measuring vessel, a feed pump for introducing the liquid to be dispensed into said measuring vessel under pressure, a multiway cock connected to said vessel, a double acting measuring piston in said vessel, locking means controlled by said piston adapted to prevent manipulation of said liquid reversing means before said piston has attained the end of its stroke, a closed circuit comprising a vertically disposed casing projecting above the highest level obtainable in said vessel, an outlet conduit for said pump extending into said casing up to a point near the top thereof, a plurality of conduits adapted to connect the bottom of said casing to each side of said piston through the ways of said cock, an inlet pipe for the pump, a pipe enveloping the inlet pipe, means for connecting the top of the casing with said enveloping pipe, and choking means associated with said last means in the top of said casing.

6. An apparatus for distributing liquids in measured quantities comprising, in combination, a measuring vessel, a feed pump for introducing the liquid to be dispensed into said measuring vessel under pressure, a multiway cock connected to said vessel, a double acting measuring piston in said vessel, locking means controlled by said piston adapted to prevent manipulation of said liquid reversing means before said piston has attained the end of its stroke, means on said locking means for preventing rotation of said liquid reversing means in one direction when unlocked by said locking means, a closed circuit comprising a vertically disposed casing projecting above the highest level obtainable in said vessel, an outlet conduit for said pump extending into said casing up to a point near the top thereof, a plurality of conduits adapted to connect the bottom of said casing to each side of said piston through the ways of said cock, an inlet pipe for said pump, a pipe enveloping the inlet pipe, means for connecting the top of the casing with said inlet pipe, and choking means associated with said last means in the top of said casing.

7. An apparatus for distributing liquids in measured quantities comprising, in combination, a measuring vessel, means for introducing the liquid to be dispensed into said measuring vessel under pressure, liquid reversing means connected to said vessel, a double acting measuring piston in said vessel, locking means controlled by said piston adapted to prevent manipulation of said liquid reversing means before said piston has attained the end of its stroke, a plurality of toothed sectors carried by said liquid reversing means, and a pawl for each of said toothed sectors adapted to engage therein when said liquid reversing means is released by said locking means for preventing rotation thereof in one direction.

8. An apparatus for distributing liquids in measured quantities comprising in combination, a measuring vessel, means for introducing the liquid to be dispensed into said measing vessel under pressure, liquid reversing means connected to said vessel, a double acting measuring piston in said vessel, locking means carried by said piston, a plurality of grooves formed in said liquid reversing means normally engaged by said locking means and adapted to be released thereby when said piston is at the end of its stroke, a plurality of pawls carried by said locking means, and a toothed sector for each of said pawls carried by said liquid reversing means adapted to be engaged by said pawls when said liquid reversing means is released by said locking means for preventing rotation thereof in one direction.

9. An apparatus for distributing liquids in measured quantities comprising, in combination, a measuring vessel, means for introducing the liquid to be dispensed into said measuring vessel under pressure, liquid reversing means connected to said vessel, a double acting measuring piston in said vessel, locking means controlled by said piston adapted to prevent manipulation of said liquid reversing means before said piston has attained the end of its stroke, a normally closed distribution pipe connected to said vessel through said liquid reversing means, and means responsive to a predetermined pressure for automatically opening said distribution pipe.

10. An apparatus for distributing liquids in measured quantities comprising, in combination, a measuring vessel, means for introducing the liquid to be dispensed into said measuring vessel under pressure, liquid reversing means connected to said vessel, a double acting measuring piston in said vessel, locking means controlled by said piston adapted to prevent manipulation of said liquid reversing means before said piston has attained the end of its stroke, means on said locking means for preventing rotation of said liquid reversing means in one direction when locked by said locking means, a normally closed distribution pipe connected to said vessel through said liquid reversing means, and means responsive to a predetermined pressure for automatically opening said distribution pipe.

11. An apparatus for distributing liquids in measured quantities comprising, in combination, a measuring vessel, means for introducing the liquid to be dispensed into said measuring vessel under pressure, liquid reversing means connected to said vessel, a double acting measuring piston in said vessel, locking means controlled by said piston adapted to prevent manipulation of said liquid reversing means before said piston has attained the end of its stroke, means for separating any gas carried along by the liquid to be dispensed before said liquid enters said measuring vessel, a normally closed distribution pipe connected to said vessel through said liquid reversing means, and means responsive to a predetermined pressure for automatically opening said distribution pipe.

12. An apparatus for distributing liquids in measured quantities comprising, in combination, a measuring vessel, means for introducing the liquid to be dispensed into said measuring vessel under pressure, liquid reversing means connected to said vessel, a double acting measuring piston in said vessel, locking means controlled by said piston adapted to prevent manipulation of said liquid reversing means before said piston has attained the end of its stroke, means on said locking means for preventing rotation of said liquid reversing means in one direction when unlocked by said locking means, means for separating any gas carried along by the liquid to be dispensed before said liquid enters said measuring vessel, a normally closed distribution pipe connected to said vessel through said liquid reversing means, and means responsive to a predetermined pressure for automatically opening said distribution pipe.

13. An apparatus for distributing liquids in measured quantities comprising, in combination, a measuring vessel, means for introducing the liquid to be dispensed into said measuring vessel under pressure, liquid reversing means connected to said vessel, a double acting measuring piston in said vessel, locking means controlled by said piston adapted to prevent manipulation of said liquid reversing means before said piston has attained the end of its stroke, a plurality of toothed sectors carried by said liquid reversing means, a pawl for each of said toothed sectors adapted to engage therein when said liquid reversing means is released by said locking means for preventing rotation thereof in one direction, a normally closed distribution pipe connected to said vessel through said liquid reversing means, and means responsive to a predetermined pressure for automatically opening said distribution pipe.

14. An apparatus for distributing liquids in measured quantities comprising, in combination, a measuring vessel, means for introducing the liquid to be dispensed into said measuring vessel under pressure, liquid reversing means connected to said vessel, a double acting measuring piston in said vessel, locking means carried by said piston, a plurality of grooves formed in said liquid reversing means normally engaged by said locking means and adapted to be released thereby when said piston is at the end of its stroke, a plurality of pawls carried by said locking means, a toothed sector for each of said pawls carried by said liquid reversing means adapted to be engaged by said pawls when said liquid reversing means is released by said locking means for preventing rotation thereof in one direction, a normally closed distribution pipe connected to said vessel through said liquid reversing means, and means responsive to a predetermined pressure for automatically opening said distribution pipe.

In testimony whereof I affix my signature.

ADOLF BARGEBOER.